Sept. 16, 1952 J. F. EMERSON 2,611,121
ELECTRONIC VOLTAGE REGULATOR
Filed Aug. 14, 1946 4 Sheets-Sheet 1

INVENTOR
JOHN F. EMERSON
BY
ATTORNEY

Sept. 16, 1952   J. F. EMERSON   2,611,121
ELECTRONIC VOLTAGE REGULATOR
Filed Aug. 14, 1946   4 Sheets-Sheet 3

INVENTOR
JOHN F. EMERSON

Sept. 16, 1952           J. F. EMERSON           2,611,121
ELECTRONIC VOLTAGE REGULATOR
Filed Aug. 14, 1946                        4 Sheets-Sheet 4
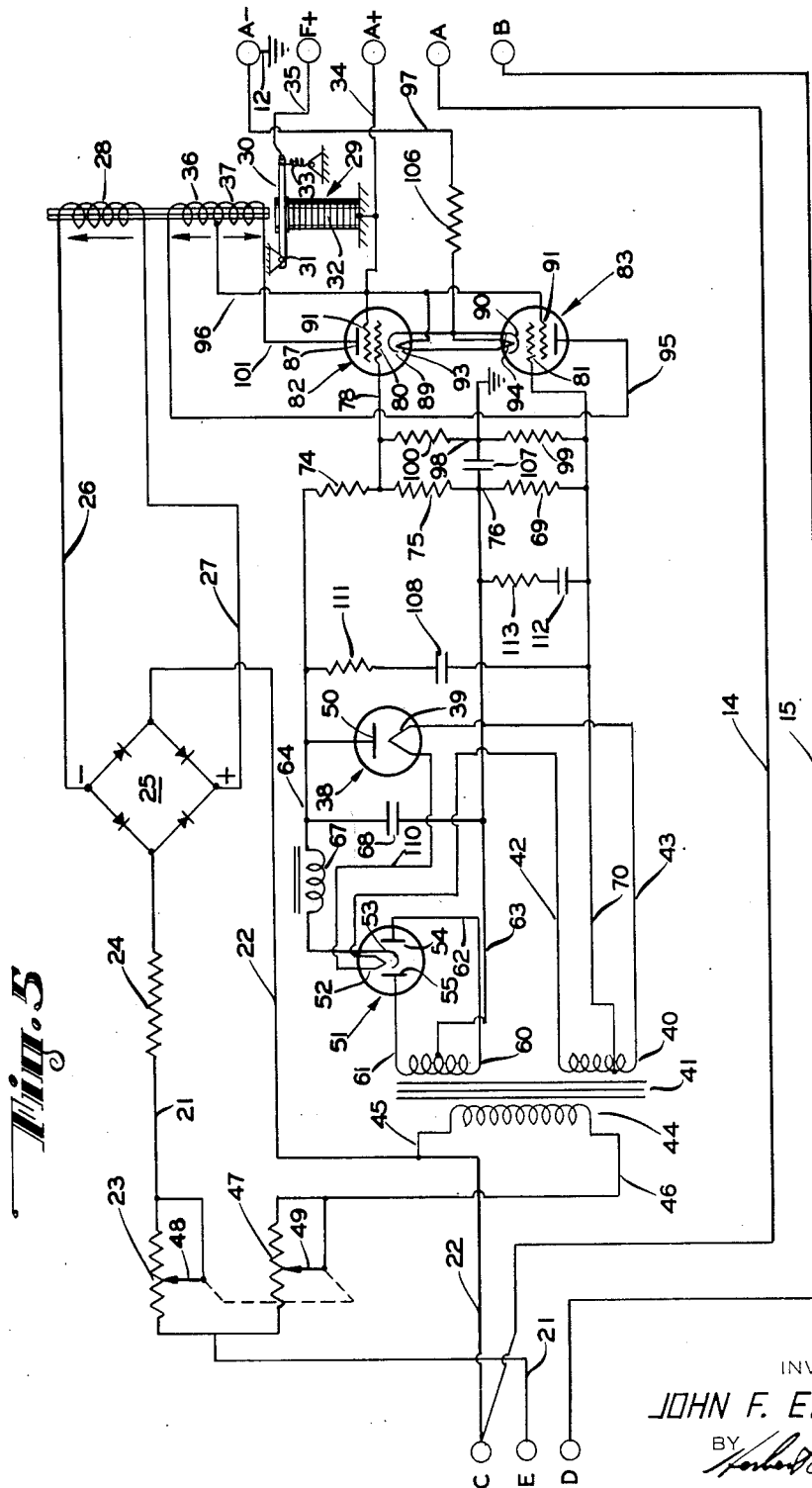
INVENTOR
JOHN F. EMERSON
BY
ATTORNEY Patented Sept. 16, 1952

2,611,121

UNITED STATES PATENT OFFICE 2,611,121

ELECTRONIC VOLTAGE REGULATOR

John F. Emerson, Hasbrouck Heights, N. J., assignor to Bendix Aviation Corporation, Teterboro, N. J., a corporation of Delaware Application August 14, 1946, Serial No. 690,459

10 Claims. (Cl. 322—28)

The present invention relates to electrical regulating apparatus and more particularly to an electronic voltage regulator.

An object of the invention is to provide in combination with a carbon pile voltage regulator having a voltage responsive control coil, an additional network for operating additional means for affecting the pile in accordance with the condition of a temperature limited diode which is so arranged as to be sensitive to the root mean square value or effective value of the voltage of a regulated alternating current.

Another object of the invention is to provide novel means for regulating the voltage output of an alternating current generator in accordance with the root mean square value thereof.

Another object of the invention is to provide novel electronic means for regulating the output of an alternating current generator.

Another object of the invention is to provide in combination with an electronic regulator, means for carrying the regulating operation during the warm up period of the electronic tubes and in case of failure of the electronic regulator.

Another object of the invention is to provide a voltage regulator to correct for changes in the driven speed of the generator, generator output wave form and applied load.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

In the drawings:

Figure 5 is a circuit diagram of a second form of the invention.

Figure 1:
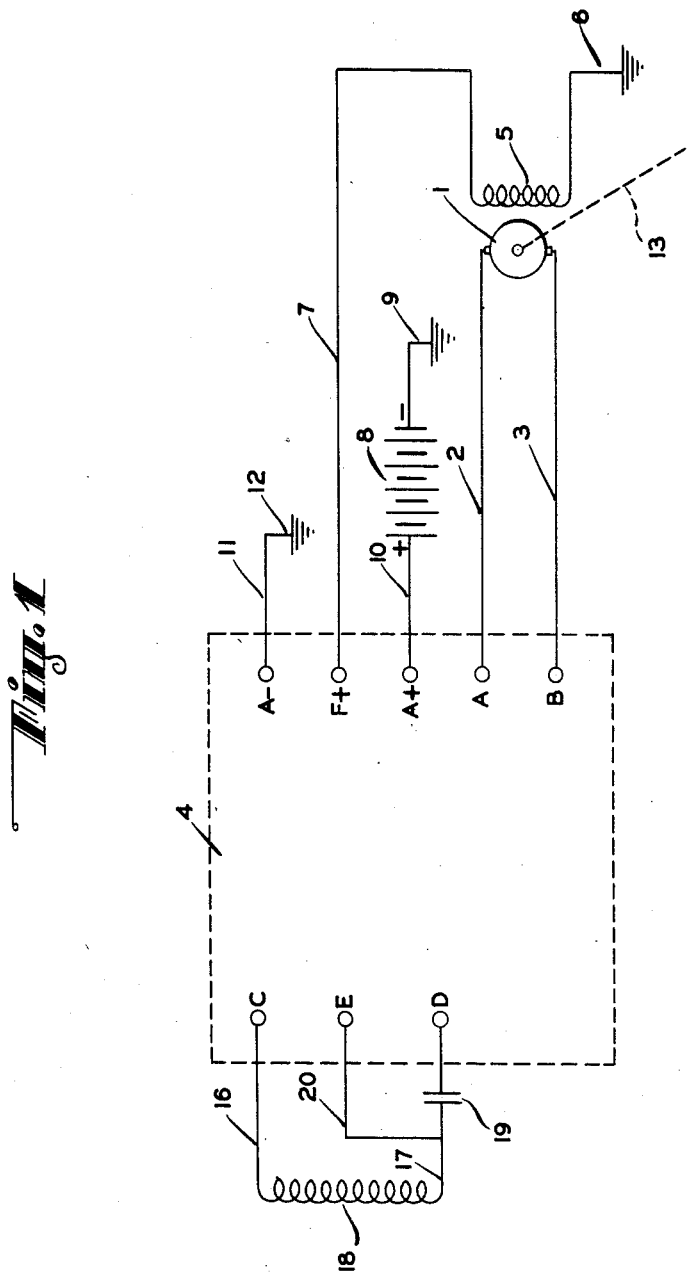
Figure 1 is a circuit diagram illustrating a generator system to which the present invention may be applied.

Referring to the drawing of Figure 1, there is shown an alternating current generator of conventional type and indicated by the numeral 1. The generator 1 has a suitable armature winding, not shown, and output lines 2 and 3 leading to input connectors A and B of a voltage regulator, indicated generally by the numeral 4.

The generator 1 has an exciting field winding 5 connected at one end to a ground connection 6 and at the opposite end through a conductor 7 to a connection F+ of the regulator 4.

There is further provided a source 8 of direct current or electrical energy which is connected at one end to the field winding 5 through a grounded connection 9, while the opposite end is connected through a conductor 10 to a connection A+ of the regulator 1. The source of electrical energy may be a battery having a constant voltage or a direct current generator regulated in a suitable manner so as to provide a constant voltage output.

The source of electrical energy 8 excites the field winding 5 of the generator 1 through conductors 7 and 10 and the grounded connections 6 and 9 and the excitation of the field winding 5 is controlled by the regulator 4, as will be explained hereinafter. The source of electrical energy 8 is further connected to the regulator 4 by a conductor 11 and grounded connection 12.

A shaft for rotating the armature of the generator 1 is indicated in dotted lines by the numeral 13 and the shaft 13 may be driven from an engine or other suitable power source.

Figure 2:
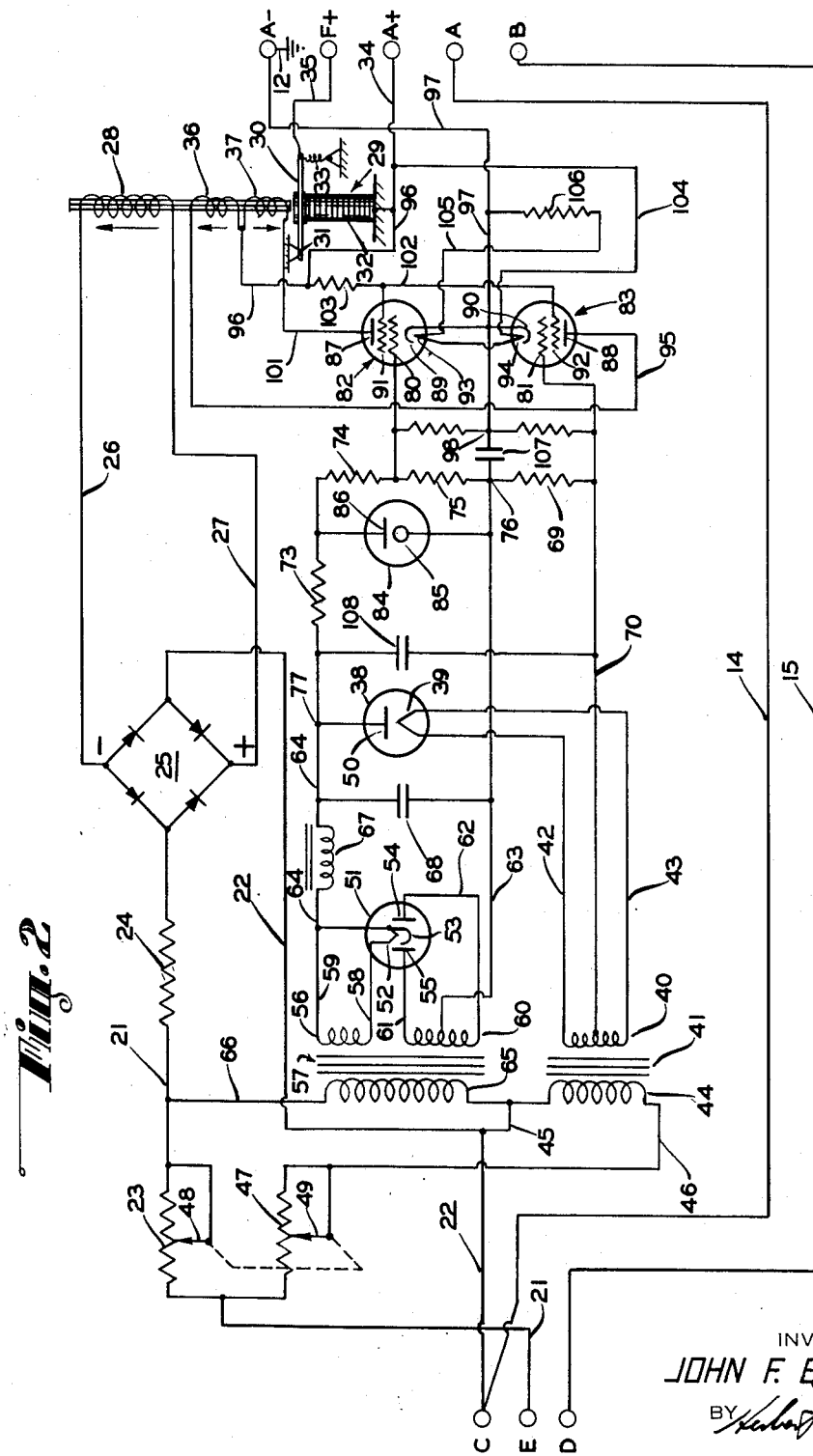
Figure 2 is a circuit diagram of an electronic voltage regulating system embodying the present invention.

The regulator 4, as shown in Figures 2 and 5, has conductors 14 and 15 which lead from the input connections A and B to the output connections C and D which are in turn connected through conductors 16 and 17 to an electrical load 18, such as an alternating current motor or other suitable load means. There is provided in the line 17 a suitable capacitor 19 which is added to take care of the power factor of the inductor type generator and which capacitor may not be required with a generator of low internal impedance, as with the usual slip ring type. Capacitor 19 is not essential to the regulator unit 4, but is shown as a conventional means of increasing the maximum power output of the generator 1.

A conductor 20 leads from the line 17 to a connector E. Conductors 21 and 22 are provided in the regulator 4 and lead from the connections E and C and are arranged so as to sense the voltage across the output lines 16 and 17. Line 21 leads through resistors 23 and 24 to an input connection of a rectifier 25, while the line 22 leads to the opposite input connection of the rectifier 25.

Output connections 26 and 27 lead from the negative and positive terminals, respectively, of the rectifier 25 to an electromagnetic winding 28 which controls a carbon pile regulator indicated generally by the numeral 29.

The regulator 29 is shown diagrammatically in the drawing as including an armature 30 pivoted at 31 and exerting a compressive force upon a carbon pile resistance 32 under tension of a spring 33. The spring 33 tends to decrease the resistance of the carbon pile 32, while the electromagnet 28 tends to move the armature 30 in a direction for increasing the resistance of the carbon pile 32. The spring 33 is so arranged as to normally balance the pull on the armature 30 by the electromagnet 28 when the electromagnet is energized by a line voltage having a predetermined value. The spring 33 is preferably of a type such as shown in the copending patent application Serial No. 570,002 of William G. Neild, filed December 27, 1944, now U. S. Patent No. 2,427,805.

The carbon pile 32 is connected at one end by a conductor 34 to connection A+ and at the opposite end by a conductor 35 to connection F+ of the regulator 4. It will be seen then that the carbon pile 32 controls the excitation of the field winding 5 in response to the output voltage across lines 16 and 17 so as to maintain a substantially constant output voltage from the generator 1 and as thus described the same operates in the conventional manner.

The novelty of the present invention resides in the provision of an additional network controlling a pair of coils 36 and 37 in accordance with the condition of a temperature limited diode 38 which is arranged so as to be sensitive to the R. M. S. value of the voltage being controlled.

The R. M. S. voltage sensitive element or temperature limited diode 38 may be of a type having a pure tungsten filament or cathode 39. The filament 39 is connected to the secondary winding 40 of a step down transformer 41 through conductors 42 and 43. The transformer 41 has a primary winding 44 connected at one end through conductor 45 to conductor 22 and thereby to the alternating current output line 16 while the opposite end of the primary winding 44 is connected through a conductor 46 and resistor 47 to conductor 21 and thereby to the alternating current output line 17. The resistors 23 and 47 may be simultaneously adjusted by positioning arms 48 and 49 which are operated in gang by a suitable mechanical means, so as to vary the voltage setting of the regulator unit 4.

The temperature limited diode 38 has a plate element 50 and the diode is so arranged that the filament 39 is operated at a temperature below maximum so that its electronic emission and hence the current flow through the diode 38 varies approximately as the eighth power of the applied R. M. S. filament voltage.

The filament or cathode 39 and plate 50 are connected in circuit with the output of a rectifier tube 51. The rectifier tube 51 has a filament 52, cathode 53, and plate elements 54 and 55. The filament 52 is connected to a secondary winding 56 of a transformer 57 through conductors 58 and 59, while the plate elements 54 and 55 are connected to a secondary winding 60 of the transformer 57 through conductors 61 and 62. The secondary winding 60 has a center tap and negatively charged output line 63, while the cathode 53 is connected to a positively charged output line 64.

The transformer 57 has a primary winding 65 which is connected at one end through conductor 45 to the conductor 22 and thereby to the alternating current output line 16, while the opposite end of the primary winding 65 is connected through a conductor 66 to conductor 21 and through variable resistor 23 to the alternating current output line 17.

Figure 3:
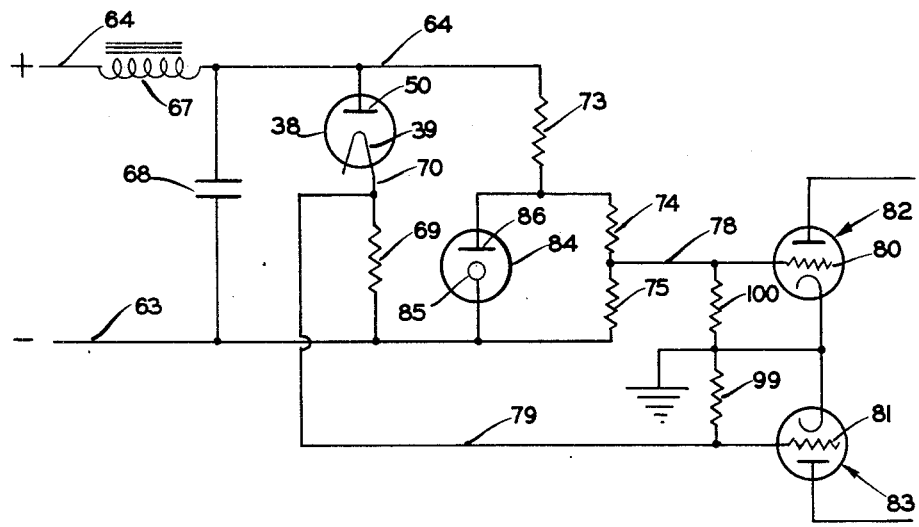
Figure 3 is a circuit diagram illustrating a portion of the control circuit so as to better show the operation thereof.

There is thus supplied to the transformer 57 an alternating current which is rectified through operation of the rectifier tube 51 so as to supply the rectifier output lines 63 and 64 with a direct current which is passed through a filter including the inductance 67 and capacitor 68 to the cathode 39 and plate 50, as shown for example in Figures 2 and 3. As shown in Figure 2, the conductor 63 is connected to a resistor 69 which in turn is connected to the cathode 39 of the diode 38 through a conductor 70 connected to a center tap of the secondary winding 40 of the transformer 41 and through which energization of the filament or cathode 39 of the diode 38 is effected.

Figure 4:
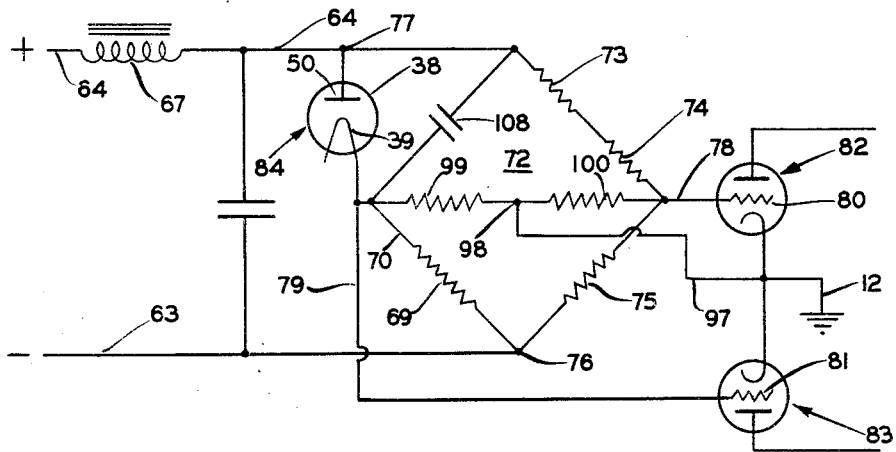
Figure 4 is a circuit diagram illustrating the bridge circuit embodied in the system.

The resistor 69 as shown in Figure 4 forms one leg of a bridge 72 in which the diode 38 and the resistors 73 and 74 and the resistance 75 are so connected as to form other legs of the bridge 72.

The rectifier output lines 63 and 64 are connected to the input of the bridge 72 at the points 76 and 77, while conductors 78 and 79 lead from the output of the bridge 72 for controlling grids 80 and 81, respectively, of electronic valves 82 and 83 as will be explained hereinafter.

A glow discharge tube 84 having a cathode 85 and plate 86 is connected across the resistors 74 and 75. The resistance of the glow tube 84 varies inversely with the voltage impressed by the rectifier 51 across the lines 63 and 64 so as to tend to maintain the grid 80 at a fixed potential with reference to the rectified output line 63. Thus, there is provided a reference voltage which is substantially independent of the waveform and voltage at the generator output lines 16 and 17 which may vary.

Further, changes in the voltage impressed across the lines 63 and 64 does not affect through the diode 38 a change in the potential of the grid 81 since the temperature limited diode 38 is so arranged that the voltage drop across it is several times that required for current saturation. Thus, the operation of the diode 38 at well above saturation frees the regulation from the affect of changes of the voltage at the plate 50 with the result that the regulation provided by the diode 38 is sensitive only to the filament voltage applied by the transformer 41. Hence, the current passed by the diode 38 is substantially independent of the output voltage supplied through the rectifier tube 51 and which voltage is effected by the waveform of the line voltage being controlled.

Thus as the temperature of the filament 39 increases, upon the R. M. S. value of the controlled voltage increasing the conductivity of the diode 38 likewise increases so as to unbalance the bridge 72 and raise the potential applied to grid 81 of tube 83 and decrease the potential applied to the grid 80 of tube 82. Upon the R. M. S. value of the controlled voltage decreasing the temperature of the filament 39 and the conductivity of the diode 38 likewise decreases causing an unbalancing of the bridge 72 in a direction raising the potential applied to the grid 80 and decreasing the potential applied to the grid 81. The aforenoted changes in the potential applied to the grids 80 and 81 varies the energization of the windings 36 and 37 of the carbon pile regulator 29.

The electronic valves 82 and 83 include, respectively, plate elements 87 and 88; cathodes 89 and 90; screen grids 91 and 92; and filaments or heaters 93 and 94.

The plate 88 of the electronic valve 83 is connected by a conductor 95 to one end of the coil 36 while the opposite end of the coil 36 is connected by a conductor 96 to the conductor 34 and thereby to the connector A+ and conductor 10 to the positive terminal of the source of electrical energy 8. The cathodes 89 and 90 of the electronic valves 82 and 83 are connected to a conductor 97 which leads from a center tap 98 intermediate the opposite ends of a pair of resistors 99 and 100, which as shown in Figure 4, are connected across the output terminals of the bridge 72. The conductor 97 extends to the grounded terminal A— and is thereby connected to the negative side of the source of electrical energy 8.

The plate element 87 of the electronic valve 82 is connected through conductor 101 to one end of the winding 37, which is connected at the opposite end through conductor 96 to the positive terminal of the source of electrical energy 8. The screen grids 91 and 92 are connected by conductor 102 and resistor 103 to conductor 96 and thereby to the positive terminal of the source of electrical energy 8. The filaments 93 and 94 are connected in series and one end thereof is connected through a conductor 104 to the conductor 34 and the opposite end thereof is connected through a conductor 105 and resistor 106 to the conductor 97 and thereby to the source of electrical energy 8.

A small capacitor 107 is connected between the lines 63 and 97 to reduce the high frequency voltage picked up by capacity coupling.

It will be seen then that in the additional improved network the tube 38 is sensitive to the R. M. S. value of the line voltage so that regulation is made independent of waveform. The output of the diode 38 controls the electronic valves 82 and 83 so as to provide a high sensitivity of around ten to twenty times that of the first or conventional network due to the sensitivity of conduction of diode 38 to filament voltage.

In order to provide stability with such a high sensitivity, a rate component is added by means of a capacitor 108 which as shown in Figures 2 and 4 is connected between the conductors 64 and 70 and across the diode 38.

The reference voltage producing glow tube 84 helps to permit this raise of sensitivity by keeping the reference voltage substantially independent of the waveform and line voltage. Moreover, the rectifier tube 51 and its filter including the inductance 67 and capacitor 68 provide a D. C. operating voltage for the additional network, including the rate capacitor 108. The time constant of the rectifier 51, filter and transformer 57 are arranged so as to be much shorter than the rest of the system, including the transformer 41, thus changes in voltage applied through the rate capacitor 68 to the conductor 70 and grid 81 leads (as to phase) that in the rest of the system in response to changes in the line voltage upon a damped oscillation.

Both the network controlling the voltage coil 28 and the additional improved network controlling the compensating coils 36 and 37 provide proportional control, and the improved network is also sensitive to the rate of change of the voltage being controlled through the action of the capacitor 108. The time constants of the two networks are arranged so as to be far smaller than those of the generator system.

In the operation of the regulator unit, the D. C. output of the bridge rectifier 25 energizes the main voltage winding 28 and tends to adjust the carbon pile 32 so as to maintain a substantially constant voltage output from the generator 1 by varying the excitation of the field 5 in the conventional manner. The first or conventional system has sufficient stability and sensitivity to regulate the line voltage while the tubes 51, 81 and 82 in the electronic network warm up. It should be noted moreover that the main winding 28 of the carbon pile regulator 29 is sensitive to the average value of the A. C. wave instead of to its R. M. S. or root mean square value as is ideal.

The second or improved network under control of the diode 38 is sensitive to the R. M. S. value of the line voltage so that the regulation is made independent of waveform. Thus when the R. M. S. value of the line voltage is at a predetermined normal value, the windings 36 and 37 tend to counterbalance and control is maintained by the main winding 28. The winding 36 tends to assist the main winding 28 while the winding 37 is arranged with opposite polarity to windings 28 and 36 and tends to oppose the same.

Thus, upon the R. M. S. value of the line voltage exceeding the normal value, the energization of the winding 36 is increased while energization of winding 37 is decreased so as to increase the magnetic force acting upon the armature 30 and tending to adjust the carbon pile 32 so as to increase the resistance thereof and thereby lower the output voltage of the generator 1.

Furthermore upon the R. M. S. value of the output voltage decreasing below a predetermined value the energization of the winding 37 is increased while the energization of winding 36 is decreased so as to tend to decrease the magnetic force applied to the armature 30 so that the spring 33 may adjust the carbon pile 32 in a resistance decreasing direction and thereby increase the excitation of the field winding 5 and the voltage output of the generator 1.

It will be seen then that the governing action is the sum of the outputs of two parallel networks. One network has low sensitivity and is sensitive to the average value of the line voltage; while the other electronically controlled network has high sensitivity and is sensitive to the R. M. S. value of the line voltage so that the regulation is made independent of waveform.

A modified form of the invention is illustrated in Figure 5 in which like numerals indicate like parts to those described with reference to Figure 2.

A feature of the modified form of Figure 5 is the provision of novel means to minimize the possibility of over voltage due to failure of the filament 39 of the diode 38.

In the circuit of Figure 2 failure of the filament 39 of the temperature limited diode 38 would cause the electronic control network to increase the voltage setting of the carbon pile regulator 29 to excessive values. Therefore, in order to avoid the latter difficulties the filament 39 of diode 38 and the filament 52 of the rectifier 51 are connected in series through a conductor 110 and across the output of the secondary winding 40 of the transformer 41, rather than the filaments being energized through separate secondary windings as in the form of Figure 2.

In the arrangement of Figure 5, it will be seen then that upon failure of the filament 39, the filament circuit to the rectifier 51 as well as the filament circuit to the diode 38 will be opened so as to cut out of operation the electronic network, whereupon the network for the voltage coil 28 will maintain control under such emergency conditions.

Moreover, where the generator 1 produces a substantially sinusoidal waveform the electronic network will operate well without the glow tube 84 of Figure 2 and under such conditions of operation, the glow tube may be eliminated, as indicated in Figure 5.

Moreover, a resistor 111 may be connected in series with the capacitor 108 so as to reduce the rate component introduced by the capacitor 108 upon change in the line voltage.

Moreover, a second capacitor 112 and resistor 113 combination are connected in series between the lines 63 and 70 so as to by-pass the resistor 69 at high frequency changes in the regulated line voltage so as to thereby cause the sensitivity of the electronic network to fall off with increasing frequency of modulation of generator output.

In the form of the invention shown in Figure 5 the conductor 70 is connected to the secondary winding 40 at a point somewhat to one side of center and such as to give an electrical center tap to the temperature limited diode 38. The voltage drop across that portion of winding 40 between conductor 70 and conductor 43 leading to the filament 38 of diode 39 should equal half the voltage drop across the filament 39 of the temperature limited diode 38 or there would be a tendency for an undesired A. C. ripple to be introduced into the A. C. control network.

The operation of the form of Figure 5 is otherwise the same as previously described with reference to Figure 2 and its operation will be readily apparent when considered in the light of the previous description.

Although only two embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a regulator for an alternating current generator, means for regulating the voltage output of said generator, said means comprising an electronic discharge device having a cathode and an anode and an electronic conduction path therebetween, connections from said generator output for supplying space current between the cathode and anode through said path, and other connections from said generator output for supplying a heating current to said cathode which varies with the effective voltage output of said generator so as to vary the electronic flow through the conduction path, a normally balanced bridge circuit means affected by variations in the electronic flow through said conduction path to unbalance said bridge circuit means, electronic control valves affected by the unbalancing of said bridge circuit means, an electromagnetically operated device for controlling said generator, said device including a main control winding adapted to be connected across the generator output, and compensating windings controlled by said electronic valves to maintain the effective voltage output of said generator at a predetermined value.

2. In a regulator for an alternating current generator, means for regulating the output of said generator, said means comprising a resistance for controlling the excitation of said generator, first means including a main control winding responsive to the average voltage output of said generator for varying said resistance, and second means including a pair of opposing auxiliary windings for varying said resistance, means including a thermionic device having an anode, a cathode, and heating means responsive to the effective voltage output of said generator for energizing one of said auxiliary windings upon the effective voltage output differing from a predetermined value.

3. In a regulator for an alternating current generator, means for regulating the output of said generator, said means comprising a variable resistance for controlling the excitation of said generator, a first electromagnetic winding to control said variable resistance, a first network operatively connected to said first winding for controlling said variable resistance in accordance with the average value of the generator output voltage, a second electromagnetic winding to control said variable resistance, and a second network operatively connected to said second winding for energizing said variable resistance only upon the root mean square value of the generator output voltage differing from a predetermined value.

4. In a regulator for an alternating current generator, means for regulating the output of said generator, said means comprising a variable resistance for controlling the excitation of said generator, an electromagnetic device for adjusting said variable resistance, said device including a main control winding and a pair of compensating windings, a first network including said main control winding for controlling said variable resistance in accordance with the average value of the generator output voltage, and a second network including a pair of electron discharge devices for energizing said compensating windings for affecting said variable resistance in accordance with the root mean square value of the generator output voltage, the first network being arranged so as to control the variable resistance during inoperation of the second network.

5. In a regulator for an alternating current generator, means for regulating the output of said generator, said means comprising a variable resistance for controlling the excitation of said generator, means including an electromagnet and first and second windings on said electromagnet for controlling said variable resistance, a first network for affecting said electromagnet through said first winding in accordance with the average value of the generator output voltage, a second network for affecting said electromagnet through said second winding including a bridge circuit for controlling the energization of said second winding in accordance with the effective voltage output of said generator upon variance in said effective voltage from a predetermined value.

6. A regulator for use with an alternating current generator, comprising, in combination, a variable resistance element for regulating said generator, means including an electromagnet and first and second windings on said electromagnet for controlling said variable resistance element, a first network for energizing said first winding in accordance with the average value of the generator output voltage, and a second network including a normally balanced bridge circuit for energizing said second winding upon deviation in the effective output generator voltage from a predetermined normal value.

7. A regulator for use with an alternating current generator, comprising, in combination, a variable resistance element for regulating said generator, means including an electromagnet and first and second windings on said electromagnet for controlling said variable resistance element, a first network for energizing said first winding in accordance with the average value of the generator output voltage, and a second network including a normally balanced bridge circuit and a temperature limited diode for unbalancing said bridge circuit so as to energize said second winding upon deviation in the effective output generator voltage from a predetermined normal value.

8. A regulator for use with an alternating current generator, comprising, in combination, a variable resistance element for regulating said generator, means including an electromagnet having a main control winding and a pair of opposing trimmer windings for controlling said variable resistance element, a first network for energizing said main winding in accordance with the average value of the generator output voltage, and a second network including a normally balanced bridge circuit and a temperature limited diode for unbalancing said bridge circuit so as to energize one or the other of said trimmer windings, dependent upon the direction of unbalance, upon deviation in the effective output generator voltage from a predetermined normal value, and means including a series circuit for deenergizing said bridge circuit for transferring control of said electromagnet to said first network upon failure of said temperature limited diode.

9. The combination comprising an electronic discharge device having a cathode and an anode and an electronic conduction path therebetween, transformer means energized by the effective value of the voltage of a regulated alternating current, said transformer means having a secondary winding for supplying space current to the anode and cathode, and said transformer means having another secondary winding for supplying a heating current to said cathode, said electronic discharge device forming one leg of a normally balanced bridge circuit, said bridge circuit becoming unbalanced upon a variation in said heating current from a predetermined normal value, means including a pair of electron discharge devices affected by the unbalancing of said bridge circuit for regulating the alternating current, capacitor means shunting the first electronic discharge device for applying a voltage to said bridge circuit in response to changes in the voltages of the regulated alternating current which leads as to phase the heating current supplied said cathode in response to said change for retarding hunting of the regulator, and additional capacitor means for causing the sensitivity of the first electronic discharge device to changes in the voltage of the regulated alternating current to decrease with increasing frequency of modulation of the regulated alternating current.

10. A regulator for use with an alternating current generator, comprising, in combination, a variable resistance element for controlling the output of said generator, an electromagnet for adjusting said element including an armature, a main voltage coil, and a pair of auxiliary compensating coils, said auxiliary coils acting in opposition one to the other, said main voltage coil responsive to the average voltage output of said generator, and means including a bridge circuit for increasing the energization of one of said auxiliary coils relative to the energization of the other of said auxiliary coils upon deviation of the effective voltage output of said generator from a predetermined value so as to tend to maintain said predetermined value.

JOHN F. EMERSON.

REFERENCES CITED

The following references are of record in the file of this patent:

UNITED STATES PATENTS

| Number | Name | Date |
|---|---|---|
| 1,789,145 | Livingston | Jan. 13, 1931 |
| 1,917,473 | Von Ohlsen et al. | July 11, 1933 |
| 1,917,474 | Von Ohlsen et al. | July 11, 1933 |
| 2,309,558 | Weatherly | Jan. 26, 1943 |
| 2,344,311 | Laird | Mar. 14, 1944 |
| 2,390,377 | Lillquist et al. | Dec. 4, 1945 |
| 2,414,317 | Middel | Jan. 14, 1947 |